United States Patent [19]
Kunz

[11] 4,448,118
[45] May 15, 1984

[54] CLEANING AND PEELING MACHINE

[76] Inventor: Paul Kunz, Deishardtstr. 3, D-5419 Döttesfeld, Fed. Rep. of Germany

[21] Appl. No.: 448,981

[22] PCT Filed: Mar. 24, 1982

[86] PCT No.: PCT/EP82/00064
§ 371 Date: Nov. 22, 1982
§ 102(e) Date: Nov. 22, 1982

[87] PCT Pub. No.: WO82/03314
PCT Pub. Date: Oct. 14, 1982

[30] Foreign Application Priority Data
Apr. 2, 1981 [DE] Fed. Rep. of Germany ....... 3113348

[51] Int. Cl.³ .............................................. A23N 7/00
[52] U.S. Cl. ......................................... 99/624; 15/3.2; 99/628; 99/634

[58] Field of Search ................. 99/516, 536, 539, 540, 99/584, 586, 587, 593, 596, 623–634; 15/3.13, 3.14, 3.16, 3.2, 3.21; 134/65, 132–134; 426/483, 519

[56] References Cited
U.S. PATENT DOCUMENTS
3,123,114 3/1964 Andrews et al. ................. 99/634 X
4,258,069 3/1981 Amstad ............................. 99/626 X Primary Examiner—Timothy F. Simone
Attorney, Agent, or Firm—Donald Brown

[57] ABSTRACT

A cleaning and peeling machine (1) with an essentially vertically aligned cylinder (6) and with a conveyor screw (26) located in the latter is designed for cleaning and peeling agricultural products. The shell (18) of the cylinder (6) has a plurality of orifices which are distributed peripherally and through which the waste which occurs, such as skins, passes outwards. So that continuous treatment can take place, the product is fed centrally into the bottom region (27) of the cylinder (6).

8 Claims, 3 Drawing Figures

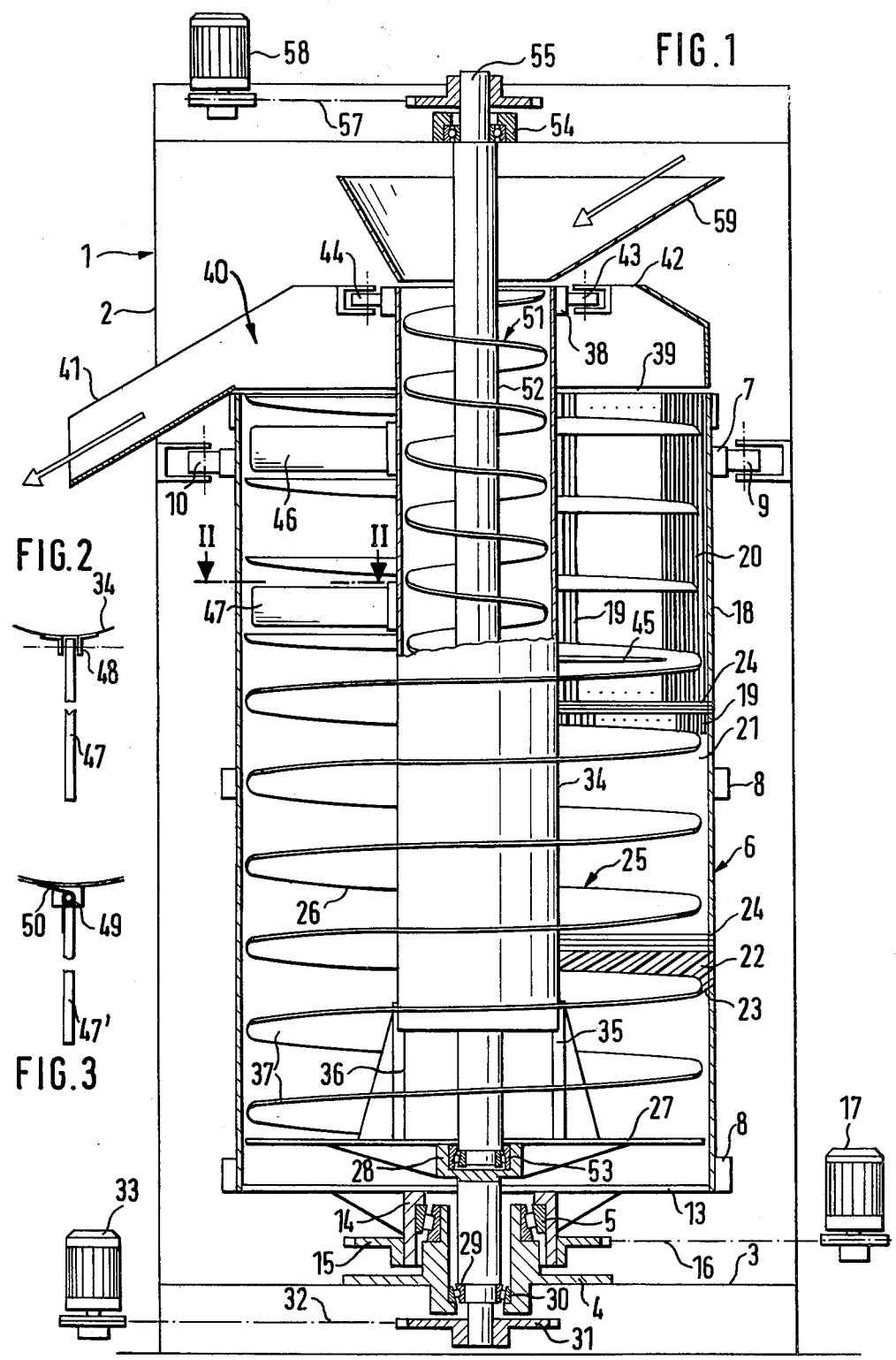

CLEANING AND PEELING MACHINE

The invention relates to a cleaning and peeling machine with an essentially vertically aligned cylinder with a plurality of orifices distributed over the wall and with a screw-like element located within the cylinder and having a conveyor screw for conveying the material to be treated.

A cleaning and peeling machine of the type described in the introduction is known from U.S. Pat. No. 4,258,069. However, in this machine, the agricultural products are fed from above, with the result that problems arise with the quality of peeling.

An installation for the treatment of agricultural products with a cylinder and a screw-like element located therein for conveying these agricultural products is known from German Pat. No. 959,144. Brushes for cleaning the agricultural products are arranged on the inner periphery of the cylinder. The agricultural products are introduced laterally on the underside of the cylinder and leave the cylinder at its top end. To ensure that perfect lateral feeding is possible, feeding has to be carried out in batches.

An apparatus for peeling plant products with a rotating receiving vessel possessing an inner wall provided with abrasion means is known from German Offenlegungsschrift No. 2,743,338. The receiving vessel has the form of a cage which consists of a plurality of rotating abrasion rollers which are rotatable about their vertical axes and which are arranged in the form of a ring at a distance from one another round the panels in the cage. A shaft with deflecting discs directed outwards is provided in the centre of the cage. The agricultural products are poured on the top side into the portion between the shaft and the cage wall and fall from one deflecting disc to another. The deflecting discs are made to rotate during operation, thus ensuring that the agricultural products fall irregularly and come up against the abrasion rollers at certain intervals. After they have fallen through the cage, they are collected on the underside and conveyed away. The cage is fastened in a housing in which the skins are collected. In this apparatus, the problem arises that because of their irregular shape, the agricultural products fall onto the abrasion rollers only accidentally and unevenly and that it is even possible for agricultural products to rebound from one deflecting disc to another without having sufficient contact with the abrasion rollers. This problem is further aggravated because the products are poured in from above.

The object of the invention is to provide an apparatus of the type described in the introduction, by means of which the above disadvantages are avoided. In particular, perfect cleaning and desired peeling of agricultural products, especially potatoes and the like, is to be possible even when feeding is continuous.

This object is achieved by means of a cleaning and peeling machine of the type described in the introduction, which is characterised, according to the invention, in that, at the lower end of the conveyor screw, there is a horizontal bottom part, and a hollow cylinder which is surrounded by the conveyor screw, is open on its top side for receiving the product to be processed and the underside of which is open and is located at a distance above the bottom part.

Further features and practicalities of the invention emerge from the description of exemplary embodiments with reference to the Figures. In the Figures:

FIG. 1 shows a sectional side view of the cleaning and peeling machine;

FIG. 2 shows a plan view along the line II in FIG. 1 of a detail of the apparatus, and FIG. 3 shows a modified embodiment of the detail shown in FIG. 2.

The cleaning and peeling machine comprises a stable housing 2. A bearing block 4 is located symmetrically in the centre on a support 3 of this housing. This bearing block carries on its top side a first roller bearing 5. A cylinder 6 is attached to the latter. The cylinder has on its outside sliding rings 7, 8 which extend over the peripheral direction and which run on sliding rollers 9, 10 fastened to the inside of the wall of the housing 2. In this way, the cylinder 6 is guided both axially downwards and radially. On the underside, the cylinder is closed by a bottom 13. This rests on a centrally arranged bearing cylinder 14 by means of which the cylinder is attached to the roller bearing 5. Fastened to the outside of the bearing cylinder 14 is a belt pulley 15. This is drive-connected via a belt 16 to a drive motor 17 and can be rotated via the latter.

The shell 18 of the cylinder 6 is preferably formed from a plurality of bars 19 which are at a distance from one another. Only part of the bars is illustrated for the sake of simplification. The distance between adjacent bars must always be less than the outer dimension of the smallest agricultural products to be treated, so that these cannot fall through between the bars. On the other hand, however, the distance should be as large as possible, so that parts, such as skins, severed from the agricultural products during cleaning and peeling can fall through the bars.

The bars 19 can be designed, for example, as round bars or as flat bars. They can have a smooth or a rough surface.

Preferably, the shell 18 of the cylinder 6 is composed both in a peripheral direction and in a vertical direction of a plurality of panels 20, 21, 22 divided from one another. Each panel comprises a plurality of bars 19, 23 and is individually exchangeable and is screwed firmly to a frame 24 of the cylinder by means of screws (not shown).

A screw-shaped element 25 with a conveyor screw 26 is located in the cylinder 6. The screw-shaped element comprises a horizontal bottom part 27, the diameter of which is smaller than the internal diameter of the cylinder 6 by an amount such that it can just rotate unimpeded in the cylinder. The bottom part 27 is connected firmly to a shaft 28 located underneath in the axis of symmetry. The shaft 28 has on its underside a shoulder 29, by means of which it is inserted rotatably via a roller bearing 30 in the interior of the bearing block 4. Attached firmly to an extension of the shaft 28, guided downwards through the bearing block 4, is a belt pulley 31. This is drive-connected to a motor 33 via a belt 32.

The conveyor screw 26 arranged symmetrically round the vertical axis of symmetry of the cylinder is provided above the bottom. This conveyor screw comprises a hollow cylinder 34 which is held at a distance above the bottom part 27 by means of vertical struts 35, 36 above the bottom part and is connected firmly to this bottom part. The actual screw flights 37 of the conveyor screw 26 are arranged round the struts and the hollow cylinder. The lowest screw flight is connected firmly to the bottom part 27. The outside diameter of the screw flights is selected so that it is smaller than the internal diameter of the cylinder 6 by an amount such that unimpeded rotation in the cylinder 6 is just possible. The hollow cylinder 34 has a sliding ring 38 at its top end on the outside.

The cylinder is open on its upper end face 39. Arranged above this end face is a hood 40 which opens on one side into a funnel-like chute 41. The hood is connected firmly to the housing 2 and is supported by the latter. On a cover plate 42, the hood has sliding rollers 43, 44 which are distributed in a peripheral direction symmetrically round the centre axis of the cylinder 6 and the hollow cylinder 34 and on the inside of which the sliding ring 38 of the hollow cylinder 34 is guided. The screw-like element is mounted so as to be rotatable downwards in an axial direction and outwards in a radial direction by means of the bearing 30 and the guide 38, 43, 44.

Ribs 45 distributed in a peripheral direction and extending virturally in a radial direction are located on the surface of the screw flights. There are also, preferably in each screw pitch, approximately two to three flaps 46, 47 (in the exemplary embodiment illustrated, only two such flaps are shown for the sake of simplification). According to one embodiment, these flaps are fastened, in the way evident from FIG. 2, to the outside of the wall of the hollow cylinder 34 by means of a retaining device 48. The flap is made of an elastic material, such as fabric rubber, which is selected so that, on the one hand, the flap has sufficient stability and exerts a certain resistance to material to be conveyed, but, on the other hand, the flap is so elastic that the material to be conveyed can finally deflect the flap from its position illustrated and is conveyed further. The flap is of such a size that no agricultural products can pass through between the screw flight and the flap and between the flap and the shell of the cylinder 6, but that, on the other hand, the flap does not come in contact either with the screw flight or with the shell of the cylinder. Preferably, the distance between the shell of the cylinder 6 and the flap is approximately 3 to 6 cm.

According to a further embodiment shown in FIG. 3, the flap 47' can also be made of a more stable material, such as, for example, sheet metal. The flap 47' is then prestressed, for example by means of a spring 50, into the position shown in FIGS. 1 and 3, so that the screw pitch is subdivided by the flap. The material to be conveyed is retained by the flap until it overcomes the resistance of the spring 50 and deflects the flap from the basic position shown and is conveyed further.

A further spiral or conveyor screw 51 is provided in the interior of the hollow cylinder 34. This has a screw core 52 which is guided on its underside through a hole in the bottom 13 and rests on the shaft 28 by means of a bearing 53 and which is rotatable by means of the bearing relative to this shaft. At its opposite upper end, the screw core 52 is mounted rotatably in its verticle position in the axis of symmetry of the cylinder 6 and consequently of the hollow cylinder 34 by means of a bearing 54 fastened to the housing 2. Fastened to an extension 55 guided outwards through the bearing 54 is a belt pulley 56 which is drive-connected to a motor 58 via a belt 57.

The hollow cylinder 34 extends upwards through the hood 40. On its side open at the top there is a filling funnel 59.

During operation, the conveyor screw 26 is made to rotate by means of the motor 17, so that upward conveyance takes place. At the same time, the cylinder 6 is made to rotate by means of the motor 33. Finally, the conveyor screw 51 is rotated via the motor 58 so that material to be poured in passes downwards from the filling funnel 59.

The material to be poured in is introduced via the filling funnel 59 and passes downwards via the conveyor screw 51 into the centre of the bottom part 27. As a result of rotation of the conveyor screw 25 and consequently of the bottom part 27, a centrifugal force is exerted on the material falling down, with the result that the material is moved outwards towards the shell of the cylinder 6. At the same time, the material is grasped by the screw flights 37 and moved slowly upwards. The rotational speed of the conveyor screw 25 is here adjusted so that, on the one hand, the material to be treated receives such a centrifugal force that it is always moved towards the shell of the cylinder 6 and that, on the other hand, it is conveyed upwards by means of the conveyor screw. The ribs 45 provided on the flights of the conveyor screw ensure that the material to be conveyed upwards is additionally turned over so that an even more uniform interaction of the material with the shell occurs.

So that sufficient centrifugal force is generated, the rotational speed of the conveyor screw 25 must be fairly high. The result of this is that the material to be conveyed is guided upwards very quickly by the conveyor screw. To ensure that sufficient treatment nevertheless takes place, a fairly large overall height is necessary. So that, even if the overall height is relatively low, sufficiently long interaction between the material to be treated and the wall of the cylinder 6 occurs, the flaps 46, 47 are provided. They retard the material to be conveyed in each case and thus increase the interaction between the material to be treated and the wall, even when the overall height is comparatively low.

The desired abrasion occurs as a result of the contact of the material to be treated with the shell of the cylinder and especially with the bars of the latter. So that sufficient abrasion occurs, the relative speed between the cylinder 6 and the conveyor screw 26 is set appropriately. The cylinder 6 itself is preferably made to rotate at such a high speed that the remains, such as, for example, skins, coming up against the bars of the shell 18 during abrasion of the material to be treated are themselves subjected, in turn, to such a centrifugal force that they fly outwards through between the bars. They then fall into the free space between the shell 18 and the housing 2 and can be conveyed away there.

In a special embodiment, the cylinder 6 is rotated in the same direction and at the same speed as, or even at a higher speed than, the conveyor screw 26. This ensures that the material to be treated is conveyed upwards through the cylinder only very slowly. The interaction of the material with the shell 18 of the cylinder is less as a result. Because of this, the rotational speed of the conveyor screw 26 can be increased, which at the same time means an increase in the centrifugal force. In an apparatus operated in this way, the bars 19, 23 are made preferably smooth or coated with rubber or plastic. It is possible by means of this apparatus to process not only hard agricultural products, such as potatoes, but also softer products, such as, for example, tomatoes.

The bars can be aligned vertically in the panels 20 and 21 or else they can also have an inclination, as indicated in the panel 22. In particular, horizontal circular bar rings can also be used. The bars should simply be arranged in each case so that they form a sufficient angle with the edge of the flights of the conveyor screw 26, with the result that, as far as possible, the agricultural products are not squashed between the flight and the bars.

In the embodiment described above, the skins and other waste fall outwards through the bars into the space between the cylinder 6 and the housing 2 as a result of rotation of the cylinder 6. According to one embodiment of the invention, brushes (not shown) are arranged on the outside of the cylinder 6 and these brush off from the bars the waste which passes out.

Since an optimum result in the cleaning and peeling of the agricultural products to be treated also depends on the type of agricultural products to be treated, the wall parts of the cylinder shell are exchangeable so that, for example, segments of greater or lesser roughness or segments with round or flat bars or the like can be inserted.

In the exemplary embodiment described above, the shell was formed by bars located at a distance from one another. Other wall forms in which suitable perforations are made are, of course, also conceivable. However, the design with the bars has the advantage of especially simple production, whilst ensuring high effectiveness at the same time.

In the exemplary embodiments described above, the material to be treated is fed via a hollow cylinder 34 located above the bottom part 27. It would also be possible, in principle, instead of this, to provide in the bottom part 27, as symmetrically in the centre as possible, a hole adjoined at its lower end by a conveyor device, by means of which the material to be treated is conveyed upwards through the hole to the bottom part 27.

Both in the case of an above-described feed centrally from above and in the case of a central feed from below, the advantage is ensured that continuous feeding and therefore continuous operation of the apparatus can take place.

What is claimed is:

1. A cleaning and peeling machine comprising a vertically-disposed first rotatable cylinder defined by a cylindrical side wall containing openings and a closed imperforate lower end, said first cylinder being open at its upper end, a second rotatable cylinder defined by an imperforate, cylindrical side wall, said second cylinder being open at its upper and lower ends and being supported in the first cylinder in concentric relation thereto for rotation about its axis, with its open lower end spaced above the closed lower end of the first cylinder and its open upper end extending above the open upper end of the first cylinder, said second cylinder being of smaller diameter than the first cylinder such as to define therewith an annular chamber in communication at its lower end with the open lower end of the second cylinder and open at the upper end of the first cylinder, a first screw-like element comprising a helical blade fixed to the outer side of the side wall of the second cylinder and extending from the top to bottom thereof, the lower end of said first screw-like element being adjacent the open lower end of the second cylinder such as to receive product to be peeled from the lower open end of the second cylinder, a second screw-like element comprising a shaft to which is fixed a helical blade supported within the second cylinder in concentric relation therewith for rotation about the axis of the shaft with its upper end adjacent the open top of the second cylinder, first means supported above the open upper end of the second cylinder for delivering product to be processed into the open upper end of the second cylinder onto the upper end of the second screw-like element, second means supported above the open upper end of the annular chamber for receiving peeled product from the upper end of the first screw-like element and means for rotating the first and second screw-like elements independently of each other in directions to move the product to be processed downwardly in the second cylinder and processed product upwardly in the annular space between the first and second cylinders and wherein the openings in the side wall of the first cylinder provide for discharge of the peelings.

2. A cleaning and peeling machine according to claim 1 comprising means for rotating the first and second cylinders at the same or different speeds.

3. A cleaning and peeling machine according to claim 1 wherein the first cylinder is formed of a plurality of spaced-apart bars.

4. A cleaning and peeling machine according to claim 2 wherein the first cylinder is formed of a plurality of spaced-apart bars.

5. A cleaning and peeling machine according to claim 1 wherein the first cylinder is formed of a plurality of exchangeable wall parts structured to define openings peripherally thereof.

6. A cleaning and peeling machine according to claim 2 wherein the first cylinder is formed of a plurality of exchangeable wall parts structured to define openings peripherally thereof.

7. A cleaning and peeling machine according to claim 1 comprising a housing within which the first and second cylinders are supported for rotation, together with the first and second screw-like elements with a space between the first cylinder and housing such as to receive peelings stripped from the processed product.

8. A cleaning and peeling machine according to claim 1 comprising a flat disk supported below the open lower end of the second cylinder for rotation therewith relative to the first cylinder, said flat disk being of a diameter corresponding substantially to the inside diameter of the first cylinder, but with a clearance such as to permit free rotation of said flat disk relative to the first cylinder.

* * * * *